United States Patent [19]

Shalati

[11] Patent Number: 4,912,160

[45] Date of Patent: Mar. 27, 1990

[54] ACID-FUNCTIONAL POLYMERS FROM HYDROXY POLYMERS AND CYCLIC ANHYDRIDES

[75] Inventor: Mohamad D. Shalati, Richton, Ill.

[73] Assignee: The Sherwin-Williams Company, Cleveland, Ohio

[21] Appl. No.: 121,199

[22] Filed: Nov. 16, 1987

[51] Int. Cl.$^4$ .................. C08K 05/05; C08L 67/06
[52] U.S. Cl. .................. 524/379; 524/317; 524/375; 524/376; 524/384; 524/385; 524/383; 524/391
[58] Field of Search .............. 524/379, 391, 317, 375, 524/376, 383, 384, 385

[56] References Cited

U.S. PATENT DOCUMENTS

| | | | |
|---|---|---|---|
| 2,884,408 | 4/1959 | Phillips et al. | 528/361 |
| 2,890,194 | 6/1959 | Phillips et al. | 260/45.4 |
| 2,890,210 | 6/1959 | Phillips et al. | 260/78.4 |
| 3,218,274 | 11/1965 | Boller et al. | 260/22 |
| 3,242,142 | 3/1966 | Hyde | 525/438 |
| 3,269,975 | 8/1966 | Lee | 260/37 |
| 3,399,109 | 8/1968 | Zimmerman et al. | 161/184 |
| 3,408,215 | 10/1968 | Wismer et al. | 106/252 |
| 3,427,255 | 2/1969 | Case | 252/426 |
| 3,650,997 | 3/1972 | Weisfeld et al. | 428/418 |
| 3,919,172 | 11/1975 | Rhein et al. | 260/75 |
| 3,975,314 | 8/1976 | Smyk et al. | 525/438 |
| 4,076,674 | 2/1978 | Koleske et al. | 525/438 |
| 4,391,965 | 7/1983 | Falkenburg et al. | 528/112 |
| 4,403,091 | 9/1983 | Hartman et al. | 528/288 |
| 4,403,093 | 9/1983 | Hartman et al. | 528/297 |
| 4,511,682 | 4/1985 | Mayer et al. | 523/402 |
| 4,650,718 | 3/1987 | Simpson et al. | 428/413 |
| 4,681,811 | 7/1987 | Simpson et al. | 428/413 |
| 4,703,101 | 10/1987 | Singer et al. | 525/443 |

*Primary Examiner*—Lewis T. Jacobs
*Assistant Examiner*—Robert E. L. Sellers, II
*Attorney, Agent, or Firm*—Robert E. McDonald

[57] ABSTRACT

Stable, non-aqueous solvent solutions of acid-functional polymers are prepared by:

(a) reacting, in the presence of an esterification catalyst, a hydroxy-functional acrylic polymer with a cyclic carboxylic anhydride at a reaction temperature from about 35° C. to about 76° C. thereby forming an acid-functional polymer having ester groups and carboxylic acid groups; and (b) maintaining the reaction of the anhydride and hydroxyl groups until the desired amount of acid functionality on the acid-functional polymer has been obtained; and then (c) adding to said acid-functional polymer a stabilizing amount of a low-molecular weight alcohol solvent under conditions which will not cause substantial reaction of the solvent and the acid-functional polymer.

20 Claims, No Drawings

ACID-FUNCTIONAL POLYMERS FROM HYDROXY POLYMERS AND CYCLIC ANHYDRIDES

BACKGROUND OF THE INVENTION

1. Field of the invention.

This invention relates to a novel process for preparing stable, non-aqueous solvent solutions of acid-functional polymers which are prepared by the reaction of cyclic carboxylic anhydrides with hydroxy-functional polymers. Acid-functional polymers prepared by the half-ester reaction of the hydroxyl groups of hydroxy-functional polymers with cyclic carboxylic anhydrides as taught herein are useful as co-reactants in a number of applications, such as chain extension or crosslinking of polyepoxides, polyamines, or polyhydroxy compounds.

2. Description of the Prior Art.

The reaction of cyclic carboxylic anhydrides, such as maleic anhydride, with hydroxy-functional molecules to produce a half-ester having an ester group and a carboxylic acid group has been known in the art. However, these acid-functional materials frequently do not remain stable for long periods of time and often demonstrate increased viscosity and even gellation upon storage. The novel process of this invention greatly minimizes the instability on storage and corresponding viscosity increase of these acid-functional materials by conducting the half-ester reaction of the anhydride and the hydroxy-functional molecule at temperatures less than about 75° C. until the reaction of the anhydride and the hydroxyl groups to form the half-ester has been completed to the desired extent and, thereafter, adding to that reaction product a stabilizing amount of a low molecular weight alcohol solvent.

BRIEF SUMMARY OF THE INVENTION

This invention involves a process for preparing stable, non-aqueous solvent solutions of acid-functional molecules, especially polymers, which process consists essentially of:

(a) reacting, in the presence of an esterification catalyst, a hydroxy-functional molecule, preferably a hydroxy-functional polymer, with a cyclic carboxylic anhydride at a reaction temperature less than about 75° C. thereby forming an acid-functional molecule having ester groups and carboxylic acid groups; and (b) maintaining the reaction of the anhydride and hydroxyl groups until the desired amount of acid functionality on the acid-functional molecule has been obtained; and then (c) adding to the acid-functional molecule a stabilizing amount of a low molecular weight alcohol solvent under conditions which will not cause substantial reaction of the low molecular weight alcohol and the acid-functional molecule.

The combination of relatively low temperature processing of the reaction between the hydroxyl groups and the anhydride, and the stabilizing effect of the unreacted low molecular weight alcohol solvent produces solvent solutions of acid-functional molecules, especially acid-functional polymers, having greatly improved stability.

Accordingly, it is an object of this invention to provide an improved process for the half-ester reaction of cyclic anhydrides and polyols to provide acid-functional molecules. It is a further object of this invention to provide an improved process for the preparation of acid-functional polymers based upon the reaction of cyclic anhydrides and hydroxy-functional polymers. Another object is to provide lower viscosity solvent solutions of acid-functional polymers. A more specific object of this invention is the preparation of acid-functional polymers which are stable on storage. These and other objects of this invention will become apparent from the following discussions.

DETAILED DESCRIPTION OF THE INVENTION

Carboxylic acid-functional molecules which are prepared by the half-ester reaction of a cyclic carboxylic acid anhydride, such as maleic anhydride, with a hydroxy-functional molecule frequently show an increase in viscosity and molecular weight upon storage. This is especially true in the case of acid-functional polymers. Although it is not our intent to be bound by theory, it is believed, based upon experimental evidence, that this gradual change in viscosity and molecular weight is due, at least in part, to a disproportionation reaction wherein transesterification takes place between two of the ester groups as shown representatively for a maleic anhydride half-ester polymeric product as follows:

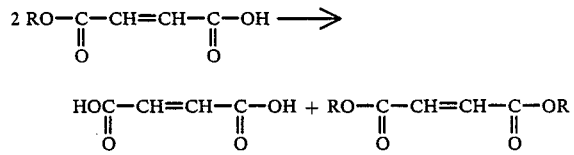

where R represents polymer radicals which could include multiple maleic half-ester groups. Such a disproportionation reaction increases the molecular weight and the viscosity of the polymer and decreases the potential number of reactive carboxylic acid sites due to the loss of some of the carboxylic acid groups from the backbone of the polymer.

It has now been discovered that the increase in viscosity, and loss of reactivity can be greatly minimized by conducting the reaction between the carboxylic acid anhydride and the hydroxyl groups at relatively low temperatures and by stabilizing the acid-functional half-ester product by the addition of a stabilizing amount of a hydrogen-bonding solvent. Preferably the hydrogen bonding solvent is an alcohol and especially a low molecular weight alkyl alcohol.

The process of this invention, which helps minimize the instability of the acid-functional half-ester compounds, could be utilized with any hydroxy-functional molecule which is to be reacted with a cyclic carboxylic anhydride to form the acid-functional half-ester reaction product, but it is especially practical for hydroxy-functional polyols having an average of at least about 2.0 hydroxyl groups per molecule. Typically the polyols will be polymers having number average molecular weights of at least about 400 and typical number average molecular weights will range from about 400 to about 30,000, and especially 1,000 to about 15,000, although polymers having number average molecular weights greater than 30,000 can also be utilized in this process.

Methods of preparing hydroxy-functional molecules and especially hydroxy-functional polymers are well known in the art and the method of preparation of the hydroxy-functional molecule or polymer is not critical to the practice of this invention. Representative hydroxy-functional polymers include polyethers, polyesters, acrylics, polyurethanes, polycaprolactones, etc.

Polyether polyols are well known in the art and are conveniently prepared by the reaction of a diol or polyol with the corresponding alkylene oxide. These materials are commercially available and may be prepared by a known process such as, for example, the processes described in *Encyclopedia of Chemical Technology*, Volume 7, pages 257-262, published by Interscience Publishers, Inc., 1951. Representative examples include the polypropylene ether glycols and polyethylene ether glycols such as those marketed as Niax® Polyols from Union Carbide Corporation.

Other useful hydroxy-functional polymers include those prepared by condensation polymerization reaction techniques as are well known in the art. Representative condensation polymerization reactions include polyesters prepared by the condensation of polyhydric alcohols and polycarboxylic acids or anhydrides, with or without the inclusion of drying oil, semi-drying oil, or non-drying oil fatty acids. By adjusting the stoichiometry of the alcohols and the acids while maintaining an excess of hydroxyl groups, hydroxy-functional polyesters can be readily produced to provide a wide range of desired molecular weights and performance characteristics. Typically, the reaction between the polyols and the polycarboxylic acids is conducted at about 120° C. to about 200° C. in the presence of an esterification catalyst such as dibutyl tin oxide.

The polyester polyols can be derived from one or more aromatic and/or aliphatic polycarboxylic acids, the anhydrides thereof, and one or more aliphatic and/or aromatic polyols. The carboxylic acids include the saturated and unsaturated polycarboxylic acids and the derivatives thereof, such as maleic acid, fumaric acid, succinic acid, adipic acid, azelaic acid, and dicyclopentadiene dicarboxylic acid. The carboxylic acids also include the aromatic polycarboxylic acids, such as phthalic acid, isophthalic acid, terephthalic acid, etc. Anhydrides such as maleic anhydride, phthalic anhydride, trimellitic anhydride, or Nadic Methyl Anhydride (brand name for methylbicyclo[2.2.1]heptene-2,3-dicarboxylic anhydride isomers) can also be used.

Representative saturated and unsaturated polyols which can be reacted in with the carboxylic acids to produce hydroxy-functional polyesters include diols such as ethylene glycol, dipropylene glycol, 2,2,4-trimethyl 1,3-pentanediol, neopentyl glycol, 1,2-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, trimethylolhexane, triethylolpropane, 1,2,4-butanetriol, glycerol, pentaerythritol, dipentaerythritol, etc.

Additionally, hydroxy-functional polymers can be prepared by the ring opening reaction of polyepoxides with primary or, preferably, secondary amines or polyamines to produce hydroxy-functional polymers. Representative amines and polyamines include ethanol amine, N,N-dimethylethanol amine, dimethyl amine, ethylene diamine, isophorone diamine, etc. Representative polyepoxides include those prepared by condensing a polyhydric alcohol or polyhydric phenol with an epihalohydrin, such as epichlorohydrin, usually under alkaline conditions. Some of these condensation products are available commercially under the designations EPON or DRH from Shell Chemical Company, and methods of preparation are representatively taught in U.S. Pat. Nos. 2,592,560; 2,582,985 and 2,694,694.

Other useful hydroxy-functional polymers can be prepared by the reaction of polyhydric alcohols with polyisocyanates to produce hydroxy-functional urethanes. Representative polyisocyanates having two or more isocyanate groups per molecule include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyanatomethyl-3,5,5-trimethylcyclohexylioscyanate, and the 1,3-cyclopentane, 1,3-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4',4''-triisocyanate, 1,3,5-triisocyanate benzene and 2,4,6-triisocyanate toluene; and the tetraisocyanates such as 4,4'-diphenyl-dimethyl methane-2,2'-5,5'-tetraisocyanate; the polymerized polyisocyanates such as tolylene diisocyanate dimers and trimers, and other various polyisocyanates containing biuret, urethane, and/or allophanate linkages.

Useful hydroxy-functional polymers can also be conveniently prepared by free radical polymerization techniques such as in the production of acrylic resins. The polymers are typically prepared by the addition polymerization of one or more monomers. At least one of the monomers will contain, or can be reacted to produce, a reactive hydroxyl group. Representative hydroxy-functional monomers include 2-hydroxyethyl acrylate, 2-hydroxypropyl acrylate, 4-hydroxybutyl methacrylate, 2-hydroxypropyl methacrylate, 3-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, para-vinyl benzyl alcohol, etc. Typically the hydroxy-functional monomers would be copolymerized with one or more monomers having ethylenic unsaturation such as:

(i) esters of acrylic, methacrylic, crotonic, or tiglic acid such as: methyl acrylate, ethyl acrylate, propyl acrylate, isopropyl acrylate, butyl acrylate, isobutyl acrylate, ethylhexyl acrylate, amyl acrylate, 3,5,5-trimethylhexyl acrylate, methyl methacrylate, ethyl methacrylate, propyl methacrylate, isobornyl methacrylate, dimethylaminoethyl methacrylate, glycidyl methacrylate, ethyl tiglate, methyl crotonate, ethyl crotonate, etc.;

(ii) vinyl compounds such as vinyl acetate, vinyl propionate, vinyl butyrate, vinyl isobutyrate, vinyl benzoate, vinyl m-chlorobenzoate, vinyl p-methoxybenzoate, vinyl α-chloroacetate, vinyl toluene, vinyl chloride, etc.;

(iii) styrene-based materials such as styrene, α-methyl styrene, α-ethyl styrene, α-bromo styrene, 2,6-dichlorostyrene, etc.;

(iv) allyl compounds such as allyl chloride, allyl acetate, allyl benzoate, allyl methacrylate, etc.;

(v) other copolymerizable unsaturated monomers such as acrylonitrile, methacrylonitrile, dimethyl maleate, isopropenyl acetate, isopropenyl isobutyrate, acrylamide, methacrylamide, and dienes such as 1,3-butadiene, etc.

The polymers are conveniently prepared by conventional free radical addition polymerization techniques. Frequently, the polymerization will be initiated by conventional initiators known in the art to generate a free radical. Typical initiators include the azo or peroxy initiators such as azobis(isobutyronitrile), cumene hydroperoxide, t-butyl perbenzoate, etc. Typically, the unsaturated monomers are heated in the presence of the initiator at temperatures ranging from about 35° C. to about 200° C. and especially 75° C. to 150° C. to effect the polymerization. The molecular weight of the polymer can be controlled, if desired, by the monomer selection, reaction temperature and time, and/or the use of chain transfer agents as is well known in the art.

Especially preferred in the practice of this invention are hydroxy-functional polyesters and hydroxy-functional acrylic vehicles. An especially preferred hydroxy-functional acrylic vehicle is the free radical addition polymerization reaction product of (a) 10 to about 40 weight percent of a hydroxy-functional ethylenically unsaturated monomer and (b) 60 to about 90 weight percent of at least one ethylenically unsaturated monomer copolymerizable with the hydroxy-functional monomer.

The cyclic carboxylic acid anhydrides useful in the practice of this invention can be any monomeric aliphatic or aromatic cyclic anhydride having one anhydride group per molecule. Representative examples of anhydrides which undergo the ring opening reaction to produce the half-ester reaction products include: phthalic anhydride, 3-nitrophthalic anhydride, 4-nitrophthalic anhydride, 3-flourophthalic anhydride, 4-chlorophthalic anhydride, tetrachlorophthalic anhydride, tetrabromophthalic anhydride, tetrahydrophthalic anhydride, hexahydrophthalic anhydride, methylhexahydrophthalic anhydride, succinic anhydride, dodecenylsuccinic anhydride, octylsuccinic anhydride, maleic anhydride, dichloromaleic anhydride, glutaric anhydride, adipic anhydride, chlorendic anhydride, itaconic anhydride, citraconic anhydride, endomethylenetetrahydrophthalic anhydride, cyclohexane-1,2-dicarboxylic anhydride, 4-cyclohexene-1,2-dicarboxylic anhydride, 4-methyl-4-cyclohexene-1,2-dicarboxylic anhydride, 5-norbornene-2,3-dicarboxylic anhydride, 1,4-cyclohexadiene-1,2-dicarboxylic anhydride, 1,3-cyclopentanedicarboxylic anhydride, diglycolic acid anhydride, etc. Maleic anhydride is especially preferred because of its reactivity and relatively low cost. Other useful anhydrides include those anhydrides having a free carboxyl group in addition to the anhydride group such as trimellitic anhydride, aconitic anhydride, 2,6,7-naphthalene tricarboxylic anhydride, 1,2,4-butane tricarboxylic anhydride, 1,3,4-cyclopentane tricarboxylic anhydride, etc.

The reaction of the hydroxy-functional molecule and the cyclic anhydride must be conducted at temperatures less than about 75° C., preferably less than 65° C., and most preferably between about 35° C. to 60° C. The reaction temperature is maintained until the reaction has proceeded to provide the desired amount of half-ester groups on the acid-functional polymer. Normally, as a convenient measure of the extent of the reaction, the reaction will be continued until no change in the amount of residual unreacted anhydride can be observed, and will generally involve reacting at least about 70%, and preferably at least 95%, of the available anhydride. If the subsequent end use of the acid-functional polymer can tolerate the remaining free anhydride, if any, no separation or removal of the excess unreacted anhydride is necessary. If the end use of the acid-functional polymer requires that it be free of any unreacted anhydride, the reaction can be continued until substantially all of the anhydride has reacted, or the free anhydride may be removed by vacuum distillation or other technique well known in the art.

The level of anhydride added need only be sufficient to provide the final desired acid value of the polymer. Typically the reaction would be conducted by admixing the polyol and the anhydride at levels to provide at least about 0.3 and normally about 0.3 to 1.0 anhydride groups for each hydroxyl group. By conducting the reaction at temperatures less than about 75° C., it appears that disproportionation during the reaction is minimized. Additionally, at these relatively low temperatures, the carboxylic acid groups formed as part of the half-ester are not appreciably reactive with the hydroxyl groups themselves and so they do not compete with the ring opening half-ester reaction of the remaining anhydrides.

In order to conduct the reaction at these relatively low temperatures, it is especially preferred to utilize an esterification catalyst. The catalyst should be present in sufficient amount to catalyze the reaction and typically will be present at a level of at least about 0.01%, and normally from about 0.05% to about 3.0%, based upon the weight of the cyclic anhydride. Catalysts which are useful in the esterification reaction of the anhydride with the hydroxy-functional molecule include mineral acids such as hydrochloric acid and sulfuric acid; alkali metal hydroxides such as sodium hydroxide; tin compounds such as stannous octoate, or dibutyltin oxide; aliphatic or aromatic amines, especially tertiary amines, such as triethylamine; and aromatic heterocyclic amines such as N-methyl imidazole and the like. Especially preferred in the practice of this invention are N-methyl imidazole and triethylamine.

Although the reaction between the hydroxy-functional molecule and the anhydride can be conducted in the absence of solvent if the materials are liquid at the reaction temperature, it is normally preferred to conduct the reaction in the presence of an inert solvent such as esters, ketones, ethers or aromatic hydrocarbons. If desired, the acid-functional molecule can be utilized as the solvent solution, or, optionally, all or part of the inert solvent may be removed, e.g. by distillation, after the reaction is completed.

In addition to the low temperature processing requirements for the reaction of the anhydride and the hydroxy-functional molecule, this invention also requires the addition of a stabilizing amount of at least one low molecular weight alcohol solvent to the acid-functional molecule. The alcohol solvent should be added under conditions which will not cause substantial reaction of the alcohol solvent. Therefore, the alcohol solvent should not be added until the reaction of the hydroxy-functional molecule and the anhydride has continued until sufficient anhydride has been reacted to form the half-ester acid groups necessary to provide the final desired acid-functional polymer and the temperature is cool enough, or allowed to cool quickly enough, to minimize any reaction of the alcohol solvent and the acid groups or remaining free anhydride. It is generally preferred to initially admix the acid-functional polymer and the alcohol solvent at temperatures less than about 35° C., or if the alcohol solvent is added to a heated solution of the acid-functional polymer, e.g. immediately after its preparation, the temperature should be allowed to cool to less than about 35° C. as soon as possible after the alcohol solvent has been added in order to minimize reaction of the alcohol with the anhydride and/or acid groups.

The alcohol solvent should be present at a sufficient amount to stabilize the acid-functional molecule and to prevent, or at least minimize, any related viscosity and/or molecular weight increase. Preferably, the alcohol solvent will be present at least 5% by weight of the acid-functional molecule and typically will be present at a level of 10 to about 35%.

The alcohol solvent will typically be a low molecular weight monoalcohol having a molecular weight less than about 150, and especially less than about 120, and most preferably less than about 90 grams per mole. The alcohol solvents should be liquids at room temperature. Especially preferred alcohols have the formula:

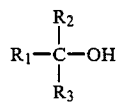

$$R_1-\underset{\underset{R_3}{|}}{\overset{\overset{R_2}{|}}{C}}-OH$$

wherein $R_1$, $R_2$ and $R_3$ are individually H or branched, cyclic, or straight chain aliphatic radicals of 1 to about 8 carbons, or aryl radicals of 6 to about 8 carbons, and may contain heteroatoms such as oxygen or nitrogen. It is especially preferred that $R_1$, $R_2$ and $R_3$ be individually H or straight chain alkyl of 1 to about 3 carbons. Particularly preferred are isobutanol and isopropanol.

Representative alcohol solvents useful in the practice of this invention include methanol, ethanol, 1-propanol, 2-dimethylaminoethanol, 2-amino-1-propanol, isopropanol, 1-butanol, isobutanol, 2-methyl-2-butanol, 2-methyl-1-butanol, 3-methyl-1-butanol, tertiary butanol, benzyl alcohol, cyclopentanol, cyclohexanol, 1-hexanol, 1-heptanol, 2-heptanol, 3-heptanol, 1-n-octanol, 2-n-octanol, and the ether alcohols and ester alcohols such as ethylene glycol monoacetate, ethylene glycol monobenzyl ether, ethylene glycol monobutyl ether, ethylene glycol monoethyl ether, ethylene glycol monohexyl ether, ethylene glycol monomethyl ether, ethylene glycol monooctyl ether, ethylene glycol monophenyl ether, propylene glycol monomethyl ether, propylene glycol monoethyl ether, propylene glycol monobutyl ether, propylene glycol monopropyl ether, etc.

The combination of relatively low reaction temperature and the addition of a stabilizing amount of a low molecular weight alcohol solvent provides acid-functional molecules, and especially acid-functional polymers, which are stable upon storage for several months or more and which do not indicate appreciable increase in viscosity or molecular weight. The use of alcohol solvents also provides solutions of the acid-functional materials which are significantly lower in viscosity than solutions using solvents which do not include any alcohols. The stabilizing effects of this process are especially pronounced for acid-functional polymers having a number average molecular weight less than about 10,000, an acid value of 30 to about 100, and a glass transition temperature less than about 50° C.

The following examples have been selected to illustrate specific embodiments and practices of advantage to a more complete understanding of the invention. Unless otherwise stated "parts" means parts by weight and "percent" is percent by weight.

EXAMPLE 1

A polymerization reactor equipped with a mechanical stirrer, reflux condenser, thermometer, nitrogen inlet, Dean-Stark water trap, heating mantle and fluid metering pump was charged with 1,412 parts xylene and heated to reflux under nitrogen. A monomer mixture comprising 122 parts Tone TM M-100 (a trademark of Union Carbide Corporation for a hydroxy-functional acrylic monomer having an average molecular weight of about 344 and comprising the reaction product of 1 mole of 2-hydroxyethyl acrylate with 2 moles of ε-caprolactone), 283 parts 2-hydroxyethyl methacrylate, 686 parts isobutyl methacrylate, 515 parts styrene, 172 parts methyl methacrylate and 9 parts t-butyl perocto-ate is metered into the polymerization reactor at a constant rate over 3 hours. The reaction was maintained at reflux and an additional amount of t-butyl peroctoate (4 parts in 10 parts xylene) was added over 30 minutes. Heating was then maintained at reflux for an additional 2 hours. The reaction product was a hydroxy-functional acrylic polymer having a number average molecular weight of 15,800 as determined by gel permeation chromatography using polystyrene as standard.

The hydroxy-functional acrylic polymer was converted into an acid-functional polymer by charging a polymerization vessel similar to that described above with 3,174 parts of the hydroxy-functional polymer, 246 parts maleic anhydride and 151 parts xylene. The reaction mixture was heated to 60° C. with stirring to obtain a homogeneous solution. A solution of triethylamine in xylene (2.5/45 parts) was added over a 30 minute time period. The reaction temperature was maintained at 60° C. for an additional 6 hours. The resultant acid-functional polymer solution was cooled to room temperature and divided into 2 batches.

To one batch (1,509 parts), 167 parts of xylene was added (Comparative Example) to obtain an unstable acid-functional polymer as shown in Table 1. To the second batch (1,960 parts) 218 parts of isopropanol was added to give a stable and useful acid-functional polymer as shown in Table 1.

TABLE 1

| | Example 1 | Comparative Example |
|---|---|---|
| % Solids | 50% | 50% |
| Acid Number (mg KOH/g) | 70 | 70 |
| Viscosity (Stokes) | | |
| initial | 8 | 27 |
| 1 week | 8 | 30 |
| 2 weeks | 8 | 58 |
| 4 weeks | 10 | 89 |
| 8 weeks | 11 | Gel |
| Density (lb/gal.) | 8.12 | 8.20 |

EXAMPLE 2

A reaction vessel equipped with a mechanical stirrer, reflux condenser, thermometer, nitrogen inlet and fluid metering pump was charged with 1,200 parts methyl amyl ketone and heated to reflux (150° C.) under nitrogen. A monomer mixture comprising 763.2 parts styrene, 474.8 parts hydroxyethyl acrylate, 180.2 parts Tone TM M-100, 381.8 parts butyl acrylate and 90 parts Vazo-67 ((2,2'-azobis)2-methylbutyronitrile initiator from E. I. du Pont de Nemours and Company) were metered into the reaction vessel over a 3 hour period. The reaction mixture was held at reflux for an additional 15 minutes and then vacuum stripped to 83.1% NVM and allowed to cool to yield a hydroxy-functional acrylic polymer.

The hydroxy-functional acrylic polymer was converted to an acid-functional acrylic polymer by charging a reaction vessel equipped as described above with 1,793 parts of the hydroxy-functional acrylic polymer, 69.1 parts methyl amyl ketone, 471.3 parts methyl propyl ketone and 374.7 parts maleic anhydride. The reaction mixture was heated under nitrogen to 60° C. and held until the maleic anhydride was in solution. A mixture of 3.9 parts triethylamine in 50 parts methylpropyl ketone is added to the reaction mixture over a 15 minute period. The reaction mixture was then held at 60° C. for 6 hours at which point the reaction mixture was allowed to cool to room temperature and 248.5 parts isopropanol was added. The resultant acid-functional resin had a Gardner Holdt viscosity of F-minus, Gardner Holdt Colorimeter value of 1-2, an NVM of 60.0%, an acid value of 115, and a density of 8.44 pounds per gallon. The acid-functional polymer showed exceptional stability and only minimal viscosity increase upon 8 weeks of storage.

EXAMPLE 3

A hydroxy-functional acrylic polymer was prepared by charging a polymerization reactor equipped as in Example 1 with 7,687 parts of methylisobutyl ketone and heated to reflux (116° C.) under nitrogen. To this heated solvent a monomer mixture comprising 1,301 parts styrene, 588 parts hydroxyethyl acrylate, 588 parts Tone TM M-100, 1,648 parts methyl methacrylate, 1,883 parts isobutyl methacrylate, 883 parts butyl methacrylate, 315 parts acrylonitrile, 2,208 parts of hydroxyethyl methacrylate, and 273 parts of Vazo-67 were added at a constant rate over 3 hours. After the addition, the reaction mixture was maintained at reflux and a solution of 27 parts of Vazo-67 in 100 parts methyl isobutyl ketone was added to the reaction mixture over a 1 hour period. The reaction mixture was held at reflux for 1 additional hour and cooled to room temperature to obtain a hydroxy-functional acrylic polymer having a number average molecular weight of 5,000 relative to polystyrene standards.

The hydroxy-functional polymer was converted to a acid-functional polymer by charging a reaction vessel equipped as described in Example 1 with 2,305 parts of the hydroxy-functional polymer of this Example and 298 parts of maleic anhydride. The mixture was heated to 55° C. to dissolve the solid maleic anhydride, then cooled to 40° C. and 3.1 parts (1 mole percent based on total maleic anhydride) of triethylamine was added to the reaction mixture over a 15 minute period. The reaction mixture was stirred and maintained at 40° C. for an additional 6 hours. The resultant solution of acid-functional acrylic polymer had an NVM of 60%, a Gardner Holdt viscosity of U-V, an acid value of 114, and a density of 8.41 pounds per gallon.

100 parts of this acid polymer solution was vacuum stripped to 70% solids and the resultant polymer solution was divided into 3 samples. 3 acid-functional polymer solutions were obtained at 60% solids and having various ratios of isopropanol/methyl isobutyl ketone (20/80, 10/90, and 0/100) by adding isopropanol and/or methyl isobutyl ketone to the above 3 samples. The storage stability of these three acid-functional polymer solutions is shown in Table 2 as a function of viscosity changes at room temperature and hot room (120° F.).

TABLE 2

| Time (weeks) | 100% MIBK RT* | 100% MIBK HR** | 10/90 IP/MIBK RT | 10/90 IP/MIBK HR | 20/80 IP/MIBK RT | 20/80 IP/MIBK HR |
|---|---|---|---|---|---|---|
| 0 | 15 | 15 | 12 | 12 | 12 | 12 |
| 1 | 23 | 31 | 23 | 29 | 21 | 24 |
| 4 | 25 | 31 | 25 | 26 | 23 | 23 |
| 8 | 28 | 40 | 27 | 32 | 23 | 24 |
| 12 | 29 | 59 | 27 | 49 | 23 | 28 |
| 16 | 29 | 98 | 26 | 70 | 23 | 30 |
| 20 | 30 | 258 | 27 | 148 | 24 | 34 |
| 24 | 30 | Gel | 26 | Gel | 23 | 53 |

*RT stands for room temperature;
**HR stands for hot room (120° F.). Viscosity units are in Stokes.

EXAMPLE 4

In a manner similar to that of Example 3 a hydroxy-functional polymer was prepared comprising 26.65% styrene, 18.75% butyl acrylate, 6.70% acrylonitrile, and 46.9% hydroxyethyl methacrylate. This hydroxy-functional polymer was converted into an acid-functional polymer by the process described in Example 3 by reacting 74.6 parts of hydroxy-functional polymer (on a solids basis) with 25.4 parts maleic anhydride at 40° C. in the presence of 2 mole percent triethylamine to yield an acid-functional polymer having an acid number of 145, a number average molecular weight of 5,100 and a percent maleic anhydride conversion of 94%. The acid-functional polymer was stable upon storage at room temperature for 24 weeks as a 60% solid solution in a solvent mixture of 20/80 isopropanol/methyl isobutyl ketone solvent mixture. Lower levels of isopropanol showed significantly more rapid increases in viscosity during storage.

EXAMPLES 5-28

The processes described for the preparation of the acid-functional polymer of Example 3 were used to prepare the polymers of Examples 5-28 with the exception of the modifications shown in Table 3.

TABLE 3

| Example Number | Temp. °C. | Catalyst Mole % | Acid Value | % Vazo 67 | Monomer Comp.** | Mn Base | % Conv. of Maleic Anhydride | Viscosity (20% Isop A+) Initial | Viscosity (20% Isop A+) 20 Weeks |
|---|---|---|---|---|---|---|---|---|---|
| 5 | 60 | 1 | 108 | 2.9 | A | 5000 | 90 | 11.8 | 22.7 |
| 6 | 40 | 3 | 108 | 2.9 | A | 5000 | 96 | 12.9 | 14.5 |
| 7 | 60 | 3 | 108 | 2.9 | A | 5000 | 96 | 14.9 | 26.1 |

TABLE 3-continued

| Example Number | Processing Variables | | | | | Mn Base | % Conv. of Maleic Anhydride | Viscosity (20% Isop A+) | |
|---|---|---|---|---|---|---|---|---|---|
| | Temp. °C. | Catalyst Mole % | Acid Value | % Vazo 67 | Monomer Comp.** | | | Initial | 20 Weeks |
| 8 | 50 | 2 | 145 | 6.5 | C | 2900 | 71 | 11.8 | 11.4 |
| 9 | 50 | 2 | 71 | 1.6 | B | 7100 | 91 | 20.2 | 27.0 |
| 10 | 50 | 2 | 145 | 1.6 | C | 8500 | 95 | 42.1 | 45.7 |
| 11 | 40 | 2 | 71 | 2.9 | B | 4400 | 87 | 11.8 | 12.9 |
| 12 | 60 | 2 | 71 | 2.9 | B | 4400 | 88 | 9.8 | 12.9 |
| 13 | 60 | 2 | 145 | 2.9 | C | 5100 | 94 | 24.9 | 28.8 |
| 14 | 50 | 1 | 71 | 2.9 | B | 4400 | 86 | 7.6 | 12.2 |
| 15 | 50 | 3 | 71 | 2.9 | B | 4400 | 91 | 11.8 | 15.3 |
| 16 | 50 | 1 | 145 | 2.9 | C | 5100 | 84 | 24.9 | 34.4 |
| 17 | 50 | 3 | 145 | 2.9 | C | 5100 | 95 | 28.8 | 29.5 |
| 18 | 40 | 2 | 108 | 6.5 | A | 2700 | 83 | 5.4 | 7.6 |
| 19 | 60 | 2 | 108 | 6.5 | A | 2700 | 88 | 6.3 | 9.8 |
| 20 | 40 | 2 | 108 | 1.6 | A | 7600 | 88 | 31.9 | 42.1 |
| 21 | 60 | 2 | 108 | 1.6 | A | 7600 | 86 | 38.6 | 20.2 |
| 22 | 50 | 1 | 108 | 6.5 | A | 2700 | 76 | 4.5 | 6.3 |
| 23 | 50 | 3 | 108 | 6.5 | A | 2700 | 87 | 7.6 | 7.6 |
| 24 | 50 | 1 | 108 | 1.6 | A | 7600 | 68 | 22.7 | 31.3 |
| 25 | 50 | 3 | 108 | 1.6 | A | 7600 | 91 | 28.8 | 31.3 |
| 26 | 50 | 2 | 108 | 2.9 | A | 5000 | 81 | 17.6 | 22.7 |
| 27 | 50 | 2 | 108 | 2.9 | A | 5000 | 80 | 15.3 | 22.7 |
| 28 | 50 | 2 | 108 | 2.9 | A | 5000 | 80 | 18.9 | 24.4 |

*Catalyst is triethylamine (mole % based on maleic anhydride)
**A = Hydroxylethyl acrylate/Tone M-100/methyl methacrylate/isobutyl methacrylate/maleic anhydride 10.95/10.95/30/70/35.05/12.35
B = Monomer composition of Example 3
C = Monomer composition of Example 4

As shown in Table 3, excellent stability can be obtained by utilizing the process of this invention.

While this invention has been described by a specific number of embodiments, other variations and modifications may be made without departing from the spirit and scope of this invention as set forth in the appended claims.

The invention claimed is:

1. A process for preparing stable, non-aqueous solvent solutions of acid-functional polymers which process consists essentially of:
 (a) reacting, in the presence of an esterification catalyst, a hydroxy-functional acrylic polymer with a cyclic carboxylic anhydride at a reaction temperature from about 35° C. to about 75° C. thereby forming an acid-functional polymer having ester groups and carboxylic acid groups; and
 (b) maintaining the reaction of the anhydride and hydroxyl groups until the desired amount of acid functionality on the acid-functional polymer has been obtained; and then
 (c) adding to said acid-functional polymer a stabilizing amount of a low-molecular weight alcohol solvent under conditions which will not cause substantial reaction of the solvent and the acid-functional polymer.

2. The process of claim 1 further characterized in that the alcohol has the formula

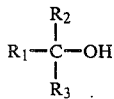

wherein $R_1$, $R_2$ and $R_3$ are individually H or alkyl of 1 to about 3 carbons.

3. The process of claim 1 further characterized in that the alcohol is selected from the group consisting of isobutanol and isopropanol.

4. The process of claim 1 further characterized in that the stabilizing low molecular weight alcohol solvent is added at a level of at least about 5% by weight based upon the weight of the acid-functional polymer.

5. The process of claim 1 further characterized in that the low molecular weight alcohol solvent is added to the acid-functional polymer at a temperature less than about 75° C.

6. The process of claim 1 further characterized in that the low molecular weight alcohol solvent is added after substantially all of the anhydride groups have been reacted to produce acid groups and ester groups.

7. The process of claim 1 further characterized in that the low molecular alcohol solvent is added to the acid-functional polymer at a temperature less than about 35° C.

8. The process of claim 1 further characterized in that the cyclic carboxylic anhydride is present at a level of about 0.3 to about 1.0 anhydride groups for each equivalent of hydroxyl.

9. The process of claim 1 further characterized in that the hydroxy-functional polymer and the anhydride are reacted at a reaction temperature between about 35° C. and 60° C.

10. The process of claim 1 further characterized in that the hydroxy-functional polymer has a number average molecular weight of at least 400.

11. The process of claim 1 further characterized in that the hydroxy-functional acrylic polymer has an average of at least 2.0 hydroxyl groups per molecule.

12. The process of claim 11 further characterized in that the hydroxy-functional acrylic has a number average molecular weight from about 400 to 7000.

13. The process of claim 1 further characterized in that the anhydride is maleic anhydride.

14. The process of claim 1 further characterized in that the catalyst is an amine.

15. The process of claim 14 further characterized in that the amine is a tertiary amine.

16. A process for producing stable, non-aqueous solvent solutions of acid-functional polymers which process comprises:

(a) reacting in the presence of an esterification catalyst a hydroxy-functional acrylic polymer with maleic anhydride at a reaction temperature from about 35°–75° C. thereby forming the half-ester acid-functional polymer, wherein the hydroxy-functional polymer has a number average molecular weight of at least about 400 and wherein the maleic anhydride is present at about 0.3 to about 1.0 moles of maleic anhydride for each equivalent of hydroxyl; and (b) maintaining the reaction of the hydroxy-functional polymer and the anhydride until the desired amount of acid functionality on the acid-functional polymer has been obtained; and then (c) adding to said acid-functional polymer at least about 5% by weight of a low molecular weight alcohol solvent under conditions which will not cause substantial reaction of the alcohol and the acid-functional polymer.

17. The process of claim 16 further characterized in that the low molecular weight alcohol is present at a level from about 10 to about 35 weight percent based upon the weight of the acid-functional polymer.

18. A process for producing stable non-aqueous solvent solutions of acid-functional free radical addition polymers which process comprises:

(a) reacting in the presence of an esterification catalyst a hydroxy-functional polymer with maleic anhydride at a reaction temperature from about 35°–60° C. thereby forming the half-ester acid-functional polymer, wherein the hydroxy-functional polymer is an acrylic polymer having a number average molecular weight of at least about 400 and which comprises the free radical addition polymerization reaction product of (i) 10 to about 40 weight percent of a hydroxy-functional ethylenically unsaturated monomer, and (ii) 60 to about 90 weight percent of at least one ethylenically unsaturated monomer copolymerizable with the hydroxy-functional monomer; and wherein the maleic anhydride is present at about 0.3 to about 1.0 moles of maleic anhydride for each equivalent of hydroxyl; and (b) maintaining the reaction of the hydroxy-functional polymer and the anhydride until the desired amount of acid functionality on the acid-functional polymer has been obtained; and then (c) adding to said acid-functional polymer at least about 5% by weight of a low molecular weight alcohol solvent under conditions which will not cause substantial reaction of the alcohol solvent and the acid-functional polymer.

19. The process of claim 18 further characterized in that the low molecular weight alcohol is present at a level from about 10 to about 35 weight percent based upon the weight of the acid-functional polymer.

20. The process of claim 18 further characterized in that the acid-functional free radical addition polymer has a number average molecular weight less than about 10,000, an acid value of 30 to 100, and a glass transition temperature less than about 50° C.

* * * * *